United States Patent
Miyamoto et al.

(10) Patent No.: US 6,582,855 B1
(45) Date of Patent: Jun. 24, 2003

(54) CURRENT COLLECTOR SUBSTRATE IN ELECTRODE FOR USE IN ALKALINE SECONDARY BATTERY, ELECTRODE USING THE SAME, AND ALKALINE SECONDARY BATTERY HAVING INCORPORATED THEREINTO THE ELECTRODE

(75) Inventors: Kunihiko Miyamoto, Tokyo (JP); Masayoshi Hiruma, Yokohama (JP); Manabu Takezawa, Yokosuka (JP)

(73) Assignee: Toshiba Battery Co., Ltd., Tokyo (JP)

( * ) Notice: Subject to any disclaimer, the term of this patent is extended or adjusted under 35 U.S.C. 154(b) by 0 days.

(21) Appl. No.: 09/573,545

(22) Filed: May 19, 2000

(30) Foreign Application Priority Data

May 19, 1999 (JP) .............................. 11-138746
Jan. 20, 2000 (JP) ...................... 2000-011853

(51) Int. Cl.[7] .............................................. H01M 4/80
(52) U.S. Cl. .............................. 429/235; 429/233; 29/2
(58) Field of Search ................................ 429/233, 235; 29/2

(56) References Cited

U.S. PATENT DOCUMENTS 5,543,250 A * 8/1996 Yanagihara et al. ............. 29/2
6,436,575 B1 * 8/2002 Weckesser et al. ......... 429/223

OTHER PUBLICATIONS

F. V. Lenel, "Powder Metallurgy, Principles and Applications," p. 1.*

* cited by examiner

Primary Examiner—Carol Chaney
Assistant Examiner—Dah-Wei D. Yuan
(74) Attorney, Agent, or Firm—Oblon, Spivak, McClelland, Maier & Neustadt, P.C.

(57) ABSTRACT

Provided is a current collector substrate in an electrode of an alkaline secondary battery, which is advantageous not only in that it has excellent holding ability for a mixture for electrode, but also in that the utilization of an active material is improved, thereby enhancing the discharge characteristics of the battery, and an electrode and an alkaline secondary battery using the same. This current collector substrate has a plurality of openings formed within the surface of a metal powder sinter sheet which has a thickness (t) of 80 $\mu$m or less and is produced by a powdery calendering process, wherein the openings have periphery portions comprising burr portions protruding in the opposite directions.

12 Claims, 2 Drawing Sheets

CURRENT COLLECTOR SUBSTRATE IN ELECTRODE FOR USE IN ALKALINE SECONDARY BATTERY, ELECTRODE USING THE SAME, AND ALKALINE SECONDARY BATTERY HAVING INCORPORATED THEREINTO THE ELECTRODE

BACKGROUND OF THE INVENTION

1. Field of the Invention

The present invention relates to a current collector substrate in an electrode for use in an alkaline secondary battery, an electrode for use in an alkaline secondary battery using the same, and an alkaline secondary battery having incorporated thereinto the electrode. More particularly, the present invention is concerned with a novel current collector substrate which is advantageous not only in that it can be produced at a low cost, but also in that it has excellent holding ability for a mixture for electrode and exhibits an appropriate current collecting efficiency; a paste-type electrode produced using the above current collector substrate, particularly, a paste-type nickel electrode; and an alkaline secondary battery having incorporated thereinto the above electrode, particularly, a nickel-hydrogen secondary battery.

2. Prior Art

As representative examples of alkaline secondary batteries, there can be mentioned a nickel-cadmium secondary battery and a nickel-hydrogen secondary battery. In the positive electrode (nickel electrode) in the alkaline secondary battery, there are a sinter-type nickel electrode and a paste-type nickel electrode. Of these two types, the paste-type nickel electrode is generally produced as follows.

First, a nickel hydroxide particle which is an active material, a conductive material, for example, cobalt monoxide which forms a conductive matrix during the initial charging after the battery assembly to exhibit a conductive property, a binder, for example, carboxymethyl cellulose, and water are mixed together, thereby to produce a paste of a viscous mixture (hereinafter, referred to as "mixture for electrode") having a predetermined composition.

Then, the thus produced paste of the mixture for electrode is directly coated onto or filled in a current collector substrate, followed by drying. The thickness of the resultant substrate is leveled by, for example, roll-calendering, simultaneously with rendering the dried mixture dense, thereby the mixture is strongly held on or in the current collector substrate.

In this case, as the current collector substrate, generally, a foamed metallic porous material sheet in which fine open pores are three-dimensionally formed is used, and specifically, a foamed Ni (nickel) porous material sheet is used. The reason why such a metallic porous material sheet is used as a current collector substrate resides in that the mixture for electrode which is filled in the open pores distributed in the inner portion of the sheet is in the form of being captured by the open pores, and hence, coming off of the mixture for electrode from the current collector substrate is suppressed, so that the resultant nickel electrode has an excellent current collecting ability.

As mentioned above, when a high capacity battery is produced, as a current collector substrate, the use of the above-mentioned metallic porous material sheet capable of having filled therein a mixture for electrode with a high density is effective. However, the metallic porous material sheet has also the following problems.

The first problem is as follows. For example, the Ni porous material sheet which has been customarily used is generally produced by a process in which a foamed urethane resin is subjected to electroless Ni plating and Ni electroplating successively, thereby to form an Ni plated layer on the skeletal portion of the sheet, and then, the resultant resin is subjected to heat treatment to remove the urethane resin from the skeletal portion by incineration. Due to this process, the price of the sheet becomes high.

When it is intended to produce a battery in a large size capable of performing a large current discharging by increasing the electrode area, the amount of the current collector substrate (Ni porous material sheet) to be used is inevitably increased. Therefore, due to the above problem, the production cost for the battery disadvantageously becomes high.

Another problem is as follows.

Such Ni porous material sheet has poor flexibility. For this reason, in the case where a cylindrical nickel-hydrogen secondary battery is assembled from a nickel electrode produced using the Ni porous material sheet as a current collector substrate and, for example, a negative electrode composed of a metal alloy having hydrogen occluded therein (hydrogen occlusion metal alloy), when the nickel electrode and the hydrogen occlusion metal alloy negative electrode are laminated through a separator and the resultant laminate is spirally wound to form an electrode group, the Ni porous material sheet is damaged by folding and the resultant cracks penetrate the separator and is brought into contact with the negative electrode, causing an occurrence of short-circuiting.

For these reasons, in the recent batteries in a large size capable of performing a large current discharging, it has been started to make a study on a coating-type electrode using a two-dimensional sheet, such as an inexpensive punched metal or expanded metal, as a current collector substrate instead of the metallic porous material sheet, which electrode is produced by coating a mixture for electrode onto the surface of the two-dimensional sheet and drying the coated mixture.

The above-mentioned coating-type electrode can be produced simply by coating a mixture for electrode onto the surface of a two-dimensional sheet at a predetermined thickness and drying the coated mixture. Therefore, the coating-type electrode is easily produced, as compared to the electrode using a metallic porous material sheet. However, this coating-type electrode has also the following problems.

The first problem is as follows. Since the current collector substrate is a two-dimensional sheet, the adhesive strength between the mixture for electrode and the current collector substrate is poor, so that the mixture for electrode is easily released from the surface of the current collector substrate. On the other hand, in the conventional metallic porous material sheet having a three-dimensional network structure, since the mixture for electrode is captured by the open pores in the three-dimensional metallic porous material sheet, coming off of the mixture for electrode does not occur.

Due to such a problem, lowering of the capacity and an increase of the electric resistance of the produced electrode occur, thus leads to lowering of the discharge capacity and lowering of the discharge voltage of the assembled battery. The occurrence of such a problem can be suppressed to some extent by increasing the content of the binder in the mixture for electrode. However, the increased binder adversely affects the active material so as to be lower the reactivity, and it is difficult to achieve a good balance between this problem about the reactivity lowering and the discharge voltage and discharge capacity of the battery.

The second problem is as follows. In the case where the active material in the mixture for electrode is a nickel hydroxide particle, since the nickel hydroxide particle is nonconductive, the electronic conductivity between the nickel hydroxide particle which is present in the position far from the current collector substrate, as viewed in the direction of the thickness of the mixture for electrode layer formed on the surface of the current collector substrate, becomes poor. For this reason, lowering of the utilization of the active material, lowering of the current collecting efficiency, increase in the electric resistance of the electrode, lowering of the discharge voltage, lowering of the discharge capacity and the like occur.

The occurrence of the above-mentioned problems can be suppressed to some extent by increasing the content of the conductive material in the mixture for electrode. However, the conductive materials which have been conventionally used, such as cobalt oxide, cobalt hydroxide and the like, form a conductive matrix during the initial charging after the battery assemble. Therefore, before the initial charging, these materials exhibit no conductivity similarly to the nickel hydroxide particle. For this reason, from the viewpoint of solving the problem about formation of a conductive matrix after the initial charging, the above-mentioned binding property between the mixture for electrode and the current collector substrate and the capturing ability for the mixture for electrode by the current collector substrate serve as extremely important factors, but, when a two-dimensional sheet is used as a current collector substrate, as mentioned above, since the capturing ability is unsatisfactory, as compared to the case of using a three-dimensional metallic porous material sheet, it is difficult to form a matrix having a sufficient conductivity. Therefore, lowering of the capacity as the electrode cannot be avoided.

OBJECT AND SUMMARY OF THE INVENTION

It is an object of the present invention to provide a current collector substrate in an electrode of an alkaline secondary battery, which is advantageous not only in that it has excellent capturing ability for a mixture for electrode and exhibits an appropriate current collecting efficiency, but also in that it can be produced at a very low cost, as compared to the current collector substrate using a three-dimensional metallic porous material sheet.

It is another object of the present invention to provide a paste application-type electrode for use in an alkaline secondary battery, which is advantageous in that the utilization of the active material in the mixture for electrode is improved.

It is still another object of the present invention to provide an alkaline secondary battery having incorporated thereinto the above-mentioned electrode, which is advantageous in that it is inexpensive and the voltage lowering during large current discharging can be suppressed.

For attaining the above objects, in the present invention, there is provided a current collector substrate for use in an alkaline secondary battery, having a plurality of openings formed within the surface of a metal powder sinter sheet having a thickness of 80 µm or less, wherein each of the openings has a periphery portion comprising a burr portion protruding from the surface of the metal powder sinter sheet.

Specifically, there is provided the current collector substrate, wherein the opening have periphery portions comprising burr portions protruding from the surface of the metal powder sinter sheet in the opposite directions, or wherein the openings which are adjacent to each other have periphery portions comprising burr portions protruding from the surface of the metal powder sinter sheet in the opposite directions, or wherein all of the openings have periphery portions comprising burr portions protruding from the surface of the metal powder sinter sheet in the same direction, or wherein the metal powder sinter sheet is an Ni powder sinter sheet which is produced by a powdery calendering process.

Further, in the present invention, there is provided an electrode for use in an alkaline secondary battery wherein a mixture for electrode is coated onto one surface or both surfaces of the above-mentioned current collector substrate, and preferably, there is provided the electrode for use in an alkaline secondary battery wherein the mixture for electrode contains, as an active material, a nickel hydroxide particle coated with a higher-order oxide of cobalt and/or a nickel hydroxide particle coated with a cobalt compound.

In addition, in the present-invention, there is provided an electrode for use in an alkaline secondary battery containing a nickel hydroxide particle coated with metallic nickel as an active material.

Still further, in the present invention, there is provided an alkaline secondary battery having incorporated thereinto the above-mentioned electrode. Particularly, there is provided a nickel-hydrogen secondary battery wherein the metal powder sinter sheet is an Ni powder sinter sheet, wherein an electrode in which the mixture for electrode contains, as an active material, a nickel hydroxide particle coated with a higher-order oxide of cobalt and/or a nickel hydroxide particle coated with a cobalt compound is used as-a positive electrode, and a hydrogen occlusion metal alloy electrode is used as a negative electrode, as well as a nickel-hydrogen secondary battery using an electrode containing a nickel hydroxide particle coated with metallic nickel as a positive electrode and a hydrogen occlusion metal alloy electrode as a negative electrode.

DETAILED DESCRIPTION OF THE INVENTION

First, the current collector substrate of the present invention is explained.

Figure 1:
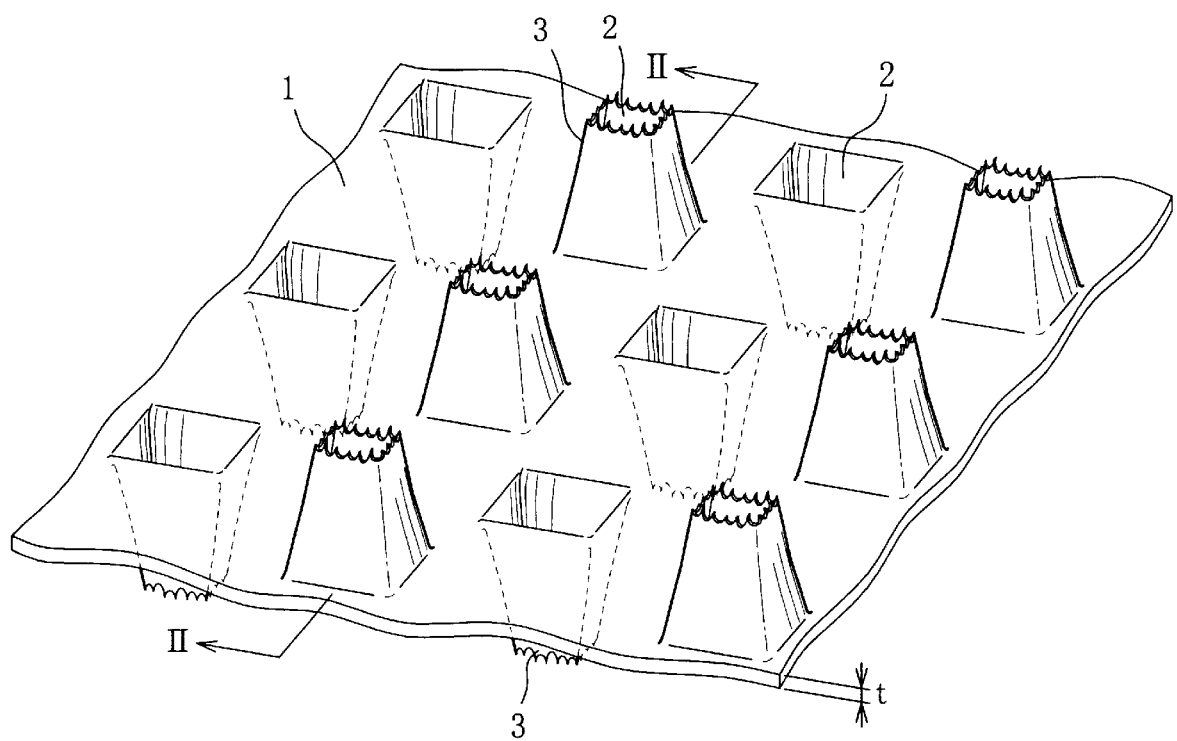
FIG. 1 is a partial perspective view showing one example of a current collector substrate of the present invention.
Figure 2:
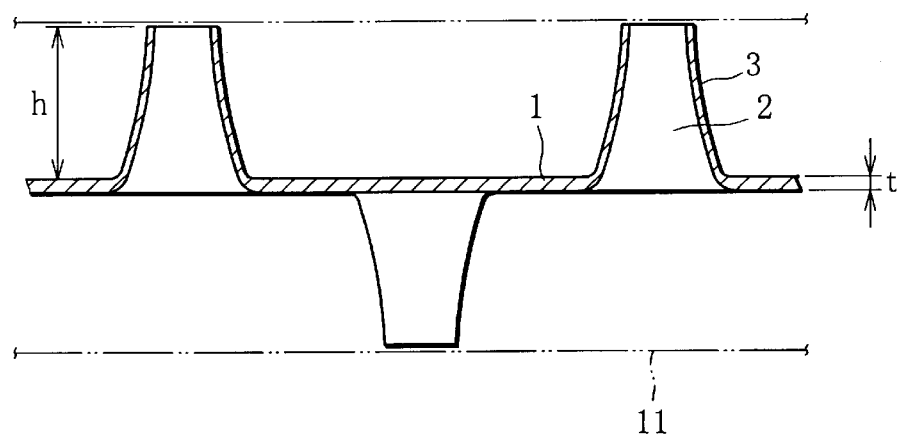
FIG. 2 is a cross-sectional view of FIG. 1, taken along the line II—II thereof.

FIG. 1 is a partial perspective view showing one example of a current collector substrate of the present invention, and FIG. 2 is a cross-sectional view of FIG. 1, taken along the line II—II thereof.

This current collector substrate comprises metal powder sinter sheet 1 produced by a powdery calendering process. Specifically, the current collector substrate is a sheet produced as follows. A metal powder (for example, Ni powder) having a particle diameter of about 0.3 to 1 µm is fed between a pair of calender rolls while adjusting the amount of the powder fed, thereby continuously producing a pressurized powder sheet having a predetermined thickness.

Then, the pressurized powder sheet is introduced into a calcination furnace in which the atmosphere is an atmosphere of an inert gas and the temperature is adjusted to a predetermined temperature so as to sinter the metal powder, thereby to produce a sheet. It should be noted that the thus sintered sheet can be further subject to hot rolling using a pair of calender rolls.

In accordance with the powdery calendering process, using a simple apparatus in a small scale, a sheet having an approximate theoretical density, namely, a sheet being dense and having an excellent flexibility can be produced only in one cycle of steps for calendering and sintering. Therefore, the production cost therefor is considerably reduced, as compared to, for example, the metallic porous material sheet.

The current collector substrate of the present invention is obtained by subjecting the entire surface of metal powder sinter sheet 1 produced by the above-mentioned powdery calendering process to mechanical processing, thereby forming openings 2 and burr portions 3 to be described later. In this case, for a reason that a sheet having a large thickness cannot be produced by the powdery calendering process, the thickness (t) of the current collector substrate of the present invention is 80 μm or less, preferably 25 to 40 μm.

In this current collector substrate (metal powder sinter sheet) 1, a plurality of openings 2 are formed within the surface thereof, and each of openings 2 has a periphery portion comprising the burr portion 3. In addition, the burr portions 3 of the openings are formed so as to protrude in the opposite directions.

A pasty mixture for electrode is coated onto both surfaces or one surface of current collector substrate 1, and then, the coated mixture is dried, and subjected to shaping treatment, for example, roll-calendering so as to adjust the thickness of the entire substrate to a predetermined thickness, thereby producing the electrode of the preset invention.

In the above process, the mixture for electrode is coated onto the surface of current collector substrate 1 as indicated by imaginary lines shown in FIG. 2 (in FIG. 2, both surfaces), and in the inner portions of the burr portions 3, and further, the burr portions 3 are crushed in the thickness direction of the substrate during the calendering, so that the mixture for electrode is held by the current collector substrate.

It is preferred that openings 2 exhibiting such an effect are formed in the entire surface of current collector substrate 1, for example, in a check lattice pattern. Further, with respect to the planer form of openings 2, there is no particular limitation, and as the forms, there can be mentioned polygon forms, such as a rectangular form shown in the figures and the similar forms thereto, a circular form, an ellipse form, and the like.

In this case, when the thickness of current collector substrate 1 is constant, the openings 2 are too small, and thus, the height (h) of the burr portion 3 becomes necessarily small. Therefore, not only does the amount of the mixture for electrode applied become unsatisfactory, but also the holding ability for the mixture for electrode becomes poor. Further, when openings 2 are too large, both of the strength and the current collecting ability of current collector substrate 1 are lowered. In addition, in such a case, during the production of an electrode (group), not only is there a danger such that the current collector substrate suffers from a damage, but also coming off or releasing of the mixture for electrode is likely to occur. For these reasons, when, for example, the thickness of current collector substrate 1 is 30 to 80 μm and openings 2 are in a rectangular form, it is preferred that the length of one side is in the range of from 30 to 1000 μm. In addition, when the spacing between the adjacent openings is too large, the holding ability for the mixture for electrode applied is lowered. On the other hand, when the spacing is too small, not only is the strength of the current collector substrate caused to be lowered, but also it becomes difficult to form the burr portions 3. Therefore, it is preferred that the spacing is set at about 300 to 1500 μm.

As mentioned above, the burr portions 3 exhibit an effect of allowing the applied mixture for electrode to be held by the current collector substrate. Simultaneously, the burr portions 3 also serve to ensure an electronic conductivity of the active material which is present far from the current collector substrate, namely, the burr portions 3 also function as a conductive passage.

In such a case, when the height (h) of the burr portion 3 is too small, it is impossible to apply the mixture for electrode in an large amount, so that the capacity of the produced electrode disadvantageously becomes low.

On the other hand, when the height (h) is large, the openings 2 are large. However, in such a case, although an electrode charged with a higher amount can be produced by increasing the amount of the mixture for electrode coated, the current collecting ability for the mixture for electrode is lowered, leading to lowering of the utilization for high ratio discharging. For this reason, it is preferred that the height (h) of the burr portion 3 is set in the range of from 50 to 1,500 μm.

A mixture for electrode is coated onto the above current collector substrate, and the applied mixture is dried, and then, the thickness is adjusted by, for example, roll-calendering, thereby producing the electrode of the present invention.

In addition, when the electrode to be produced is a nickel electrode wherein a nickel hydroxide particle is used as an active material, it is preferred to use, as the active material, the nickel hydroxide particle proposed in Japanese Patent No. 3040760 and the like, i.e., a composite nickel hydroxide particle in which the surface of the nickel hydroxide particle which is nonconductive is coated with a higher-order oxide of cobalt having a conductivity. Moreover, one in which the surface of the nickel hydroxide particle is coated with a cobalt compound, such as cobalt hydroxide, cobalt monoxide or the like, may be used. Further, one which comprises a mixture of these may be used. By the use of the above active material, even when the active material is present in the position far from the surface of the current collector substrate, the state where an electronic conductivity between the active material and the current collector substrate can be ensured is realized, thus improving the utilization of the active material.

Further, when the electrode to be produced is a nickel electrode wherein a nickel hydroxide particle is used as an active material, as the active material, there can also be used a nickel hydroxide particle produced as follows.

First, a particle comprised mainly of nickel hydroxide is immersed in an aqueous alkaline solution, such as an aqueous solution of sodium hydroxide, so that a part of the surface of the particle is dissolved in the solution. In this instance, the surface of the particle is in a state of being coated with complex ions, such as $HNO_2^-$.

Then, a reducing agent, such as hydrazine hydrate ($N_2H_2 \cdot H_2O$), is added to the resultant mixture.

In this step, the reduction of the surface of the particle proceeds, so that a composite nickel hydroxide particle in which the surface of the nickel hydroxide particle is coated with metallic Ni having a conductivity is formed.

The thus prepared composite nickel hydroxide particle has a surface which is excellent in conductivity. Therefore, it can contribute to improvement of utilization as the active material, as in the case of using the above-mentioned composite nickel hydroxide particle in which the surface of the nickel hydroxide particle is coated with a higher-order oxide of cobalt.

Figure 3:
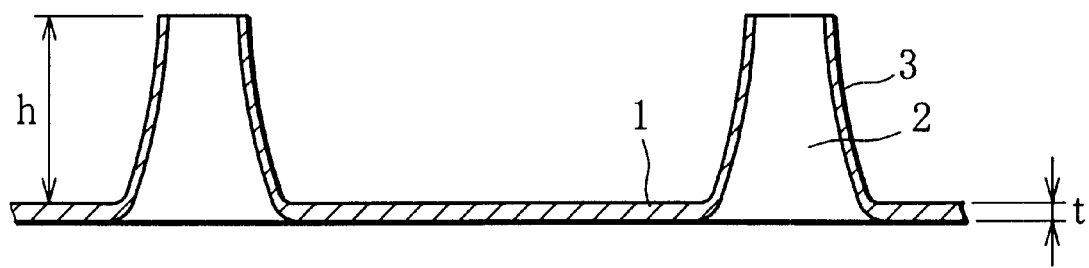
FIG. 3 is a cross-sectional view showing another example of a current collector substrate of the present invention.

The above explanation is made with respect to the current collector substrate having the burr potions protruding from both surfaces of the metal powder sinter sheet. However, the current collector substrate of the present invention may be, as shown in FIG. 3, one having the burr potions 3 formed only on one surface of metal powder sinter sheet 1.

The battery of the present invention is one having incorporated thereinto the above-mentioned electrode. For example, when the electrode is a nickel electrode wherein the above-mentioned composite nickel hydroxide particle is used as an active material, the utilization of the active material becomes high, and releasing of the active material from the current collector substrate is suppressed, so that the capacity becomes high and lowering of the voltage during large current discharging is also suppressed.

EXAMPLES (1) Production of Current Collector Substrate

Figure 4:
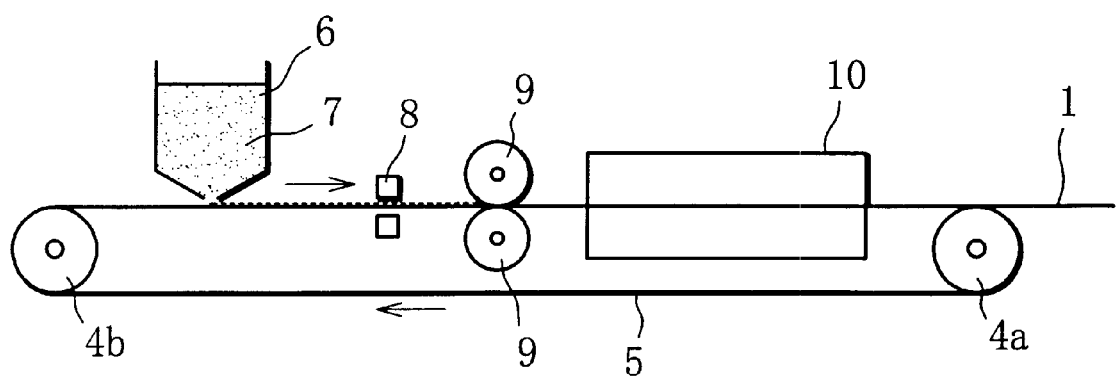
FIG. 4 is a diagrammatic view showing a line of a powdery calendering process.

By the powdery calendering process using the apparatus shown in the diagrammatic view of FIG. 4, an Ni powder sinter sheet was produced as follows.

First, on belt conveyer 5 rotated at a speed of 1.0 m/min on the infinite track between rolls 4a, 4b was continuously fed an Ni powder 7 having an average particle diameter of 0.5 $\mu$m contained in a hopper 6, and the fed Ni powder was conveyed downstream and formed into a powder layer having a thickness of 300 $\mu$m by a doctor blade 8 which was arranged on the downstream side of the hopper. Then, the powder layer was subjected to calendering through a pair of calender rolls 9, 9 having the same roll diameter under a load imparted to the unit work width of about 2.94×10$^3$ N/mm from the upward and downward directions, thereby forming a pressurized powder layer.

Next, the pressurized powder layer was introduced into calcination furnace 10 in which the atmosphere was an Ar (argon) atmosphere, and heated at a temperature of 950° C. for 5 minutes, thereby to obtain a sinter sheet 1. The sinter sheet 1 was released from a belt conveyer 5 and continuously reeled up. The thickness of the obtained sinter sheet 1 was 30 $\mu$m on an average.

Then, the sinter sheet 1 was processed so that openings 2 in a rectangular form having a side length and a height shown in Table 1 and burr portions 3 were formed, thereby producing various current collector substrates having a spacing between the openings of 0.5 mm and an opening ratio of 30%.

As a comparison, a foamed Ni sheet (thickness: 1.3 mm) having open pores with an average pore size of 500 $\mu$m and having a porosity of 96% was provided as a current collector substrate.

(2) Production of Electrode

Three mixtures for electrode A, B and C were produced as follows.
Mixture for Electrode A:

A particle comprised mainly of nickel hydroxide and a particle of a cobalt compound were first stirred and mixed together in a closed-type mixer while being subjected to heat treatment in the presence of oxygen and an aqueous alkaline solution, thereby to prepare a composite nickel hydroxide particle having an average particle diameter of about 10 $\mu$m. In the prepared composite nickel hydroxide particle, the surface of the nickel hydroxide particle is coated with a higher-order oxide of cobalt having a conductivity.

Into 100 parts by weight of the above-prepared composite nickel hydroxide particle were incorporated 0.25 part by weight of carboxymethyl cellulose, 0.25 part by weight of sodium polyacrylate, 3 parts by weight of polytetrafluoroethylene and 30 parts by weight of water, and then, the resultant mixture was kneaded to obtain a paste.
Mixture for Electrode B:

Into 100 parts by weight of a mixed powder comprising 90% by weight of a nickel hydroxide particle having an average particle diameter of 10 $\mu$m and 10% by weight of a cobalt monoxide particle having an average particle diameter of 2 $\mu$m were incorporated 0.25 part by weight of carboxymethyl cellulose, 0.25 part by weight of sodium polyacrylate, 3 parts by weight of polytetrafluoroethylene and 30 parts by weight of water, and then, the resultant mixture was kneaded to obtain a paste.
Mixture for Electrode C:

A particle comprised mainly of nickel hydroxide was immersed in an aqueous solution of sodium hydroxide, so that a part of the surface of the particle was dissolved in the solution. Then, hydrazine hydrate ($N_2H_2 \cdot H_2O$) was added thereto to reduce the surface of the particle, thereby to prepare a composite nickel hydroxide particle having a surface coated with metallic Ni.

Into 100 parts by weight of the above-prepared composite nickel hydroxide particle were incorporated 0.25 part by weight of carboxymethyl cellulose, 0.25 part by weight of sodium polyacrylate, 3 parts by weight of polytetrafluoroethylene and 30 parts by weight of water, and then, the resultant mixture was kneaded to obtain a paste.

These mixtures for electrode A, B and C were individually coated onto a current collector substrate in the embodiments shown in Table 1, and then, dried at a temperature of 100° C. for 10 minutes, followed by roll-calendering under a load imparted to the unit work width of about 6.86×10$^3$ N/mm to produce nickel electrodes having a thickness of about 0.5 mm. It should be noted that with respect to all of these nickel electrodes, the theoretical capacity is adjusted to about 1600 mAh.

(3) Assembling of Battery

A metal alloy having hydrogen occluded therein (hydrogen occlusion metal alloy) which has a composition: $LmNi_{4.0}Co_{0.4}Al_{0.3}$ was first subjected to mechanical grinding to obtain an alloy powder having an average particle diameter of 35 $\mu$m. Into 100 parts by weight of the obtained alloy powder were incorporated 0.5 part by weight of sodium polyacrylate, 0.125 part by weight of carboxymethyl cellulose, 1.5 part by weight (in terms of the solid content) of a polytetrafluoroethylene dispersion, 1 part by weight of carbon black and 30 parts by weight of water, and then, the resultant mixture was kneaded to obtain a negative mixture for electrode paste. Then, the obtained paste was applied onto a punched Ni sheet having an opening ratio of 60%, and dried at a temperature of 100° C. for 15 minutes, followed by roll-calendering under a load imparted to the unit work width of 5.88×10$^3$ N/mm, thereby producing a hydrogen occlusion metal alloy electrode having a thickness of about 0.4 mm.

Between the produced hydrogen occlusion metal alloy electrode and the above-mentioned nickel electrode was disposed a polypropylene nonwoven fabric which was subjected to hydrophilicity treatment, and then, the whole of these materials was spirally wound, to thereby obtain an electrode group, and the electrode group was accommodated in a battery casing. Then, an electrolyte liquid comprised mainly of an aqueous potassium hydroxide solution was poured into the battery casing, followed by sealing up of the casing, to assemble a cylindrical nickel-hydrogen secondary battery (rated capacity: 1500 mAh) having a size of 4/5A.

(4) Evaluation of Battery Characteristics

First, with respect to each of the batteries, a 150% charging was conducted at a temperature of 25° C. at a current of 0.5C, and subsequently, a discharging was conducted at a current of 0.5C until the voltage of the battery became 1 V.

Then, a 150% charging was conducted at a current of 0.1C, and subsequently, a discharging was conducted at a current of 0.2C until the voltage of the battery became 1 V. At this point in time, a discharge capacity was measured, and a utilization (%) of the active material was calculated from the ratio of the measured value relative to the theoretical capacity of the battery.

Further, with respect to each of these batteries, a charge-discharge cycle of a (1C, -ΔV) charging and a ( -1C, 1 V) cut-discharging was repeated in 400 times, and after the 400th cycle, a discharge capacity was measured.

The results are summarized in Table 1. Further, production costs for the respective current collector substrates in the electrodes in the above-mentioned batteries were calculated and shown in Table 1 as values relative to the production cost for the current collector substrate (foamed Ni) in Comparative Example when the production cost in Comparative Example was taken as 100.

The results of the above calculations are summarized in Table 1.

From Table 1, the following has been found. (1) First, the characteristics of the battery using the current collector substrate of the present invention bear comparison with those of the battery using the conventional foamed Ni. Further, the, production cost for the current collector substrate of the present invention is considerably reduced (about ⅓). Therefore, by using this current collector substrate, a battery can be produced at a considerably reduced cost without lowering of the characteristics, as compared to the conventional battery. (2) Further, as is apparent from the comparison between Example 4 and Example 1, when the size of the opening is large and the height of the burr portion is too large, the battery characteristics tend to lower. In addition, as is apparent from the comparison between Example 3 and Example 1, also when the size of the opening is large, a tendency of lowering of the battery characteristics is recognized. (3) Furthermore, as is apparent from the comparison among Example 1, Example 5 and Example 7, although the same current collector substrate is used, when using a mixture for electrode to be coated wherein a composite nickel hydroxide particle coated with a high-order oxide of cobalt or metallic Ni having a conductivity is used as an active material, both of a remarkable improvement in the utilization of the active material and a remarkable improvement in the charge-discharge cycle life are recognized.

From the above, it is found that the use of the current collector substrate of the present invention in combination with the composite nickel hydroxide particle is extremely useful.

As mentioned above, the current collector substrate of the present invention has excellent holding ability for a mixture for electrode and excellent current collecting efficiency for an active material although it is a two-dimensional sheet. Therefore, by using this current collector substrate, both of an improvement in the utilization of the active material and an improvement in the discharge characteristics of the battery can be achieved.

Further, this current collector substrate is produced by a powdery calendering process, and therefore, the production

TABLE 1

|  | Current collector substrate | | Nickel electrode | | Characteristics | | Production cost for current collector substrate (relative value) |
| --- | --- | --- | --- | --- | --- | --- | --- |
|  | Length of one side of opening (mm) | Height of burr portion (mm) | Type of mixture for electrode used | Surface for Application | Utilization of active material (%) | Discharge capacity after 400th cycle (mAh) |  |
| Example 1 | 0.7 | 1.2 | Mixture for electrode A | Both surfaces of current collector substrate | 105 | 1546 | 30 |
| Example 2 | 0.7 | 1.2 | Mixture for electrode A | One surface of current collector substrate | 102 | 1482 | 30 |
| Example 3 | 1.3 | 1.4 | Mixture for electrode A | Both surfaces of current collector substrate | 99 | 1380 | 30 |
| Example 4 | 1.1 | 1.7 | Mixture for electrode A | Both surfaces of current collector substrate | 98 | 1358 | 30 |
| Example 5 | 0.7 | 1.2 | Mixture for electrode B | Both surfaces of current collector substrate | 96 | 1303 | 30 |
| Example 6 | 0.7 | 1.2 | Mixture for electrode B | One surface of current collector substrate | 92 | 1249 | 30 |
| Example 7 | 0.7 | 1.2 | Mixture for electrode C | Both surfaces of current collector substrate | 108 | 1607 | 30 |
| Comparative Example | Foamed Ni sheet | | Mixture for electrode B | Entire current collector substrate | 105 | 1531 | 100 | cost therefor is extremely low, as compared to that for the current collector substrate using the conventional foamed metallic porous material. In addition, this current collector substrate has also excellent flexibility. Therefore, an accident of short-circuiting is unlikely to occur during the battery production. Further, a battery having characteristics which bear comparison with those of the conventional-battery can be produced at a low cost, and thus, from a commercial point of view, this current collector substrate is extremely highly important.

What is claimed is:

1. An electrode for use in an alkaline secondary battery, comprising:

metal powder sinter sheet as a substrate of said electrode, said sheet including two surfaces, a thickness of 80 $\mu$m or less between the surfaces, and protrusion portions distributed over at least one of the surfaces, each of the protrusion portions protruding from the one surface and having a through hole extending between the surfaces; and a mixture layer coating said sheet so that the protrusion portions are embedded therein, said layer including, as an active material, a nickel hydroxide particle coated with a higher-order oxide of cobalt which is conductive.

2. The electrode according to claim 1, wherein the protrusion portions are disposed on both the surfaces of said sheet.

3. The electrode according to claim 2, wherein the protrusion portions are alternately disposed on both the surfaces of said sheet.

4. The electrode according to claim 1, wherein the protrusion portions are disposed on one of the surfaces of said sheet.

5. The electrode according to claim 1, wherein said sheet is a Ni powder sinter sheet.

6. An alkaline secondary battery comprising the electrode according to claim 1.

7. An electrode for use in an alkaline secondary battery, comprising:

a metal powder sinter sheet as a substrate of said electrode, said sheet having two surfaces, a thickness of 80 $\mu$m or less between the surfaces, and protrusion portions distributed over at least one of the surfaces, each of the protrusion portions protruding from the one surface and having a through hole extending between the surfaces; and a mixture layer coating said sheet so that the protrusion portions are embedded therein, said layer including, as an active material, a nickel hydroxide particle coated with metallic nickel.

8. The electrode according to claim 7, wherein the protrusion portions are disposed on both the surfaces of said sheet.

9. The electrode according to claim 8, wherein the protrusion portions are alternately disposed on both the surfaces of said sheet.

10. The electrode according to claim 7, wherein the protrusion portions are disposed on one of the surfaces of said sheet.

11. The electrode according to claim 7, wherein said sheet is a Ni powder sinter sheet.

12. An alkaline secondary battery comprising the electrode according to claim 7.

* * * * *